(12) United States Patent
Duchin et al.

(10) Patent No.: US 11,048,738 B2
(45) Date of Patent: Jun. 29, 2021

(54) RECORDS SEARCH AND MANAGEMENT IN COMPLIANCE PLATFORMS

(71) Applicant: EMC IP Holding Company LLC, Hopkinton, MA (US)

(72) Inventors: Zohar Duchin, Brookline, MA (US); Ehsan Masud, Leesburg, VA (US); Michelle Zhong, Marietta, GA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 137 days.

(21) Appl. No.: 16/263,377

(22) Filed: Jan. 31, 2019

(65) Prior Publication Data

US 2020/0250213 A1     Aug. 6, 2020

(51) Int. Cl.
*G06F 16/33*     (2019.01)
*G06F 16/338*     (2019.01)
*G06F 16/31*     (2019.01)

(52) U.S. Cl.
CPC ........ *G06F 16/3347* (2019.01); *G06F 16/313* (2019.01); *G06F 16/319* (2019.01); *G06F 16/338* (2019.01)

(58) Field of Classification Search
CPC .. G06F 16/313; G06F 16/319; G06F 16/3347; G06F 16/338; G06F 16/24578
See application file for complete search history.

(56) References Cited

U.S. PATENT DOCUMENTS

| 6,285,999 B1* | 9/2001 | Page ..................... G06F 16/951 |
| 2010/0153324 A1* | 6/2010 | Downs .................. G06F 40/258 706/21 |
| 2016/0179906 A1* | 6/2016 | Roustant ............. G06F 16/3334 707/728 |

OTHER PUBLICATIONS

Anh, V. N., de Kretser, O., & Moffat, A. (Sep. 2001). "Vector-space ranking with effective early termination." In Proceedings of the 24th annual international ACM SIGIR conference on Research and development in information retrieval (pp. 35-42). (Year: 2001).*

(Continued)

*Primary Examiner* — Tamara T Kyle
*Assistant Examiner* — Lana Alagic
(74) *Attorney, Agent, or Firm* — Ryan, Mason & Lewis, LLP

(57) ABSTRACT

A method in one embodiment comprises defining a plurality of fields in a plurality of electronic documents, wherein the plurality of fields respectively correspond to governance, risk and compliance system data structures, identifying a plurality of relationships between the electronic documents based on one or more cross-references between fields of two or more different electronic documents of the plurality of electronic documents, and assigning respective ranks to the plurality of electronic documents based on the relationships. In the method, a query is received from a user device, and a listing of candidate documents of the plurality of electronic documents is retrieved in response to the query. Scores for respective ones of the candidate documents are computed based on at least the assigned ranks, and a response to the query is transmitted to the user device, wherein the response comprises the listing of candidate documents sorted according to the computed scores.

21 Claims, 8 Drawing Sheets

(56) References Cited

OTHER PUBLICATIONS

Ogheneovo, E. E., & Japheth, R. B. (2016). Application of vector space model to query ranking and information retrieval. International Journal of Advanced Research in Computer Science and Software Engineering, 6(5). (Year: 2016).*

Vicente, P., & da Silva, M. M. (Jun. 2011). A conceptual model for integrated governance, risk and compliance. In International Conference on Advanced Information Systems Engineering (pp. 199-213). Springer, Berlin, Heidelberg. (Year: 2011).*

Wikipedia, "PageRank," https://www.en.wikipedia.org/wiki/PageRank, Jan. 14, 2019, 21 pages.

Wikipedia, "Okapi BM25," https://www.en.wikipedia.org/wiki/Okapi_BM25, Sep. 11, 2018, 3 pages.

Wikipedia, "Governance, Risk Management, and Compliance," https://en.wkipedia.org/wiki/Governance,_risk_management,_and_compliance, Dec. 25, 2018, 5 pages.

RSA, "Integrated Risk Management—RSA Archer Suite," https://www.rsa.com/en-us/products/integrated-risk-management, downloaded Jan. 14, 2019, 13 pages.

Wikipedia, "Inverted Index," https://en.wikipedia.org/wiki/Inverted_index, Sep. 11, 2018, 3 pages.

RSA, "RSA Archer GRC Platform—Automate, Integrate, Manage & Report Across Your Enterprise," Data Sheet, Jan. 2018, 4 pages.

* cited by examiner

210

220

$$M = \begin{pmatrix} 0 & 1/2 & 1 & 0 \\ 1/3 & 0 & 0 & 1/2 \\ 1/3 & 0 & 0 & 1/2 \\ 1/3 & 1/2 & 0 & 0 \end{pmatrix} \begin{matrix} A \\ B \\ C \\ D \end{matrix}$$

310

ENTER KEYWORDS TO SEARCH

| 312 | 314 SEARCH |

316 TOPIC TERMS   318 FREE TEXT TERMS

```
SELECT tblIVModuleContent.*
FROM tblIVModuleContent
    INNER JOIN tblIVFieldDef ON tblIVModuleContent.related_field_id = tblIVFieldDef.field_id
    INNER JOIN tblIVFieldDef AS tblIVFieldDef_1 ON tblIVModuleContent.field_id = tblIVFieldDef_1.field_id
WHERE
    tblIVFieldDef.level_id != tblIVFieldDef_1.level_id
```

```
dtype = {'field_id' :np.int, 'content_id' :np.int, 'record_id' :np.int, 'create_login' :np.int,
         'related_field_id' : np.int} module_content_df = pd.read_csv(f'{PATH}{bill}ModuleContent.csv', dtype=dtype)

module_content_df.drop(['create_date'], axis=1, inplace=True)

module_content_df.head()
```

FIG. 7
700

| | FIELD_ID | CONTENT_ID | RECORD_ID | CREATE_LOGIN | RELATED_FIELD_ID |
|---|---|---|---|---|---|
| 0 | 84 | 150855 | 123097 | 189 | 87 |
| 1 | 84 | 150855 | 123395 | 189 | 87 |
| 2 | 84 | 150856 | 123097 | 189 | 87 |
| 3 | 84 | 150856 | 123395 | 189 | 87 |
| 4 | 84 | 150857 | 123098 | 189 | 87 |

```
text_df = pd.read_csv(f'{PATH}tblIVTestDataRevised.csv', encoding='Latin-1')
text_df.head()
```

FIG. 10
1000

| CONTENT_ID | FIELD_ID | FIELD_VALUE |
|---|---|---|
| 123006 | 1578.0 | ATP-001 |
| 123006 | 1580.0 | 00.0 INTRODUCTION |
| 123006 | 1581.0 | THE COMPANY XYZ INFORMATION SECURITY POLICY ("... |
| 123006 | 1582.0 | THE INFORMATION SECURITY POLICY APPLIES TO THE... |
| 123006 | 1583.0 | <p>THE COMPANY'S INFORMATION SECURITY POLICY D... |

RECORDS SEARCH AND MANAGEMENT IN COMPLIANCE PLATFORMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to records management and query processing in information processing systems.

BACKGROUND

Governance, Risk and Compliance (GRC) products contain solutions such as Regulatory and Corporate Compliance Management (RCCM) for managing the ever-changing laws and regulations with which an enterprise or organization, such as, for example, a corporation, financial institution or healthcare provider, must comply. GRC platforms enable enterprises to manage, for example, their risks and controls across the organization. These platforms, which support and record many organizational processes, include a large amount of information on a variety of subjects such as, for example, vendors, regulations, controls, procedures, audits and assets. The information can be used to automate business processes, streamline workflows, understand current status, and manage risk.

The amount of information that is recorded within enterprise GRC systems poses challenges for users and computer resources. For example, when GRC system users attempt to retrieve information about a specific topic using conventional querying techniques, numerous non-relevant results lacking a useful order are returned. As a result, in a time consuming and inefficient use of computer resources, users are required to review many different documents before finding the desired information.

Accordingly, there is a need for an improved computer driven structure and process which is capable of accurately organizing and prioritizing different records within a GRC platform so that users may efficiently find, review and update the records that are relevant to their inquiries and needs.

SUMMARY

In one embodiment, an apparatus comprises at least one processing platform including a plurality of processing devices. The processing platform is configured to define a plurality of fields in a plurality of electronic documents, wherein the plurality of fields respectively correspond to GRC system data structures, to identify a plurality of relationships between the plurality of electronic documents based on one or more cross-references between fields of two or more different electronic documents of the plurality of electronic documents, and to assign respective ranks to the plurality of electronic documents based on the plurality of relationships. The processing platform is also configured to receive at least one query from a user device, to retrieve a listing of candidate documents of the plurality of electronic documents in response to the at least one query, to compute a plurality of scores for respective ones of the candidate documents based on at least said assigned ranks, and to transmit a response to the at least one query to the user device, wherein the response comprises the listing of candidate documents sorted according to the computed plurality of scores.

These and other illustrative embodiments include, without limitation, apparatus, systems, methods and computer program products comprising processor-readable storage media.

BRIEF DESCRIPTION OF THE DRAWINGS

FIG. 5 shows example structured query language (SQL) code for retrieving data from a GRC platform database in an illustrative embodiment.

FIG. 7 shows example pseudocode for loading retrieved data into a dataframe in an illustrative embodiment.

FIG. 8 shows an example dataframe in response to execution of the pseudocode in FIG. 7 in an illustrative embodiment.

FIG. 9 shows example pseudocode for retrieving content from respective documents in an illustrative embodiment.

FIG. 10 shows an example output in response to execution of the pseudocode in FIG. 9 in an illustrative embodiment.

DETAILED DESCRIPTION

Figure 1:
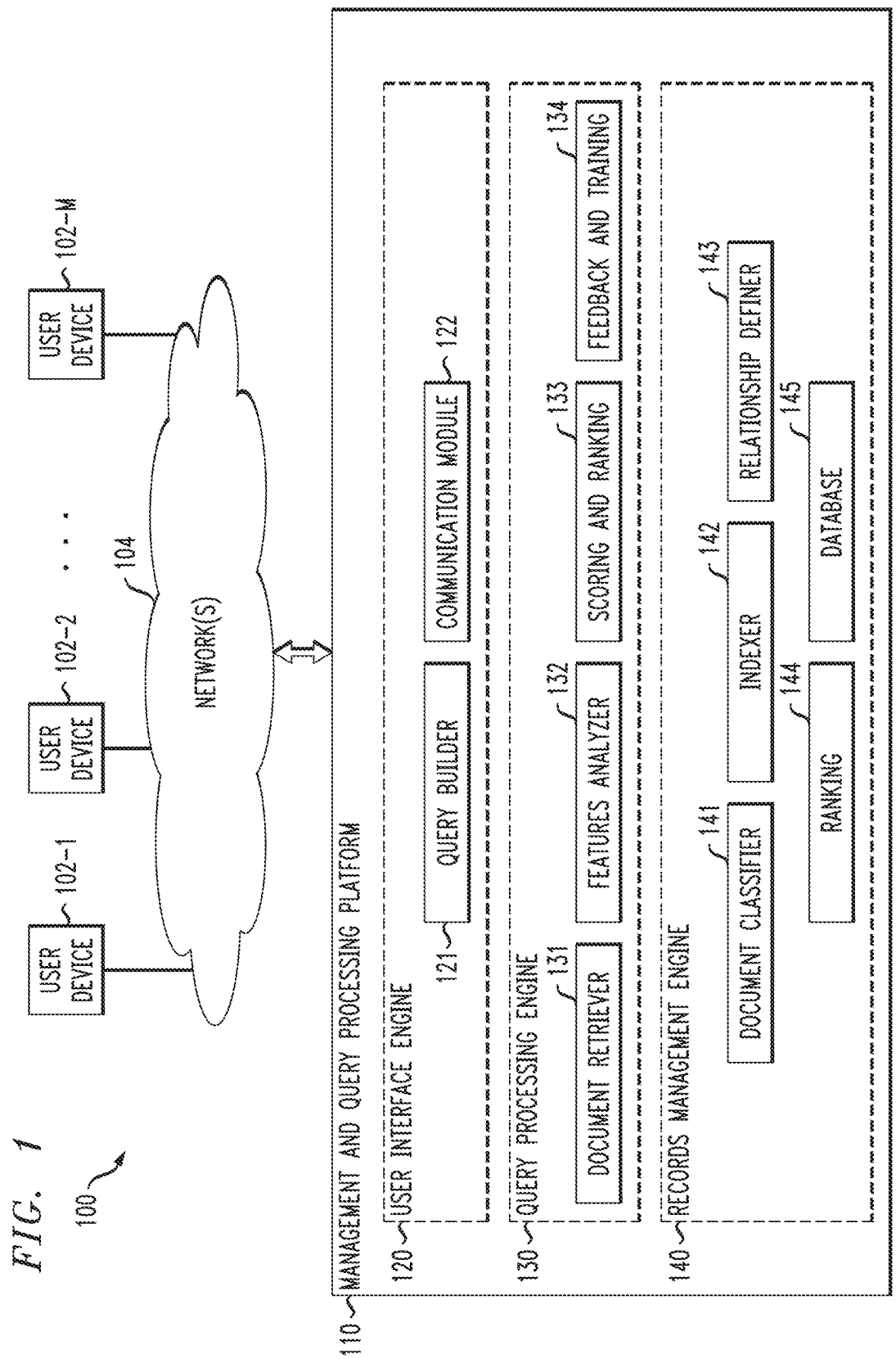
FIG. 1 is a block diagram of an information processing system comprising a management and query processing platform configured for ranking and prioritizing different records in an illustrative embodiment.

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Examples of public clouds may include, but are not limited to, Amazon Web Services® (AWS), Google Compute Engine® (GCE), and Microsoft Azure® Services platforms. Thus, enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, a "field" refers to part of a document's content and includes data elements which track various GRC management functions for an enterprise and the impact that each GRC management function might have on other GRC management functions. These data elements may include one or more references to a field in another document, which references a field in another document, and so on. References to fields may be between documents in different applications of a GRC platform. In a non-limiting illustrative example, a document in an Information Technology (IT) Assets Management application of a GRC platform may be a record of a specific device, and include a field with detected vulnerabilities on the device, where the vulnerabilities are referenced in a document in a Vulnerability Risk Management (VRM) application of the GRC platform. The document in the VRM application, for example, may contain a mitigation plan field which is a reference to a document in a Controls Monitoring Program Management application of the GRC platform, where there is a description of controls in an enterprise that mitigate these vulnerabilities. This control document may include a field of mapped regulations which is a reference to documents of the various regulations that the controls address.

As used herein "applications" of a GRC platform refer to respective areas of the GRC platform allowing for enterprise management or tracking. Examples of applications include, but are not necessarily limited to, Controls Assurance Program Management, IT Risk Management, Security Incident Management, Bottom-Up Risk Assessment, Loss Event Management, Third Party Governance, and/or Issues Management.

As used herein a "document" or "electronic document" refers to a collection of electronic content including multiple sentences, words, and fields.

As used herein, a "unique identification (ID)" or "unique ID" refers to any hashing function that is applied on the text of a document. The unique ID can be also an ID provided by a user according to a naming convention. Each field and each document may correspond to a unique ID.

As used herein a "relationship" refers to a directed link between documents. For example, when a field is created in one document and then used by another document, there is a relationship (directed) between these two documents. Relationships may be between documents in different applications of a GRC platform.

As used herein a "topic" refers to a specific purpose in the GRC context. GRC topics can include, but are not necessarily limited to, operational risk management, third party engagement, access control, audit and accountability, information system management, loss event management and/or issues management. One or more documents may pertain to one or more topics. Topics may be defined by keywords attached to documents by a user (e.g., GRC platform administrator, enterprise personnel).

A topic can include one or more predefined terms that indicate something about a document. For example, in a Security Incident Management application of a GRC platform, a document that describes an incident of an employee whose mobile device was infected by malware that harvests credentials, may be assigned topics such as, for example, "mobile device," "access control," "authentication," and/or "human resource." Topics might be assigned manually by a user, in which case the topic will be a field in the document. Topics also can be algorithmically inferred from the document content and/or metadata using machine learning methods. Examples of algorithmically inferred topics include "recently created documents" or "most reviewed documents."

In order to increase operations efficiency and enable effective information sharing within an organization, a GRC platform synchronizes information and activities across governance and compliance so that activities can be more effectively reported and wasteful data and process overlaps can be avoided. Governance includes a management approach for direction and control of an enterprise, using a combination of management information and hierarchical management control structures. Risk management includes processes for identification, analysis and responding to risks that might adversely impact the objectives of an enterprise. Compliance refers to conformance with requirements, such as, for example, laws, regulations, contracts, strategies and/or policies. Compliance includes identifying applicable requirements, determining the state of compliance, determining risks and cost of non-compliance, determining expenses to achieve compliance and implementing compliance steps.

In addition to RCCM, GRC products contain various solutions and applications such as, but not necessarily limited to, IT and Operational Risk Management, Third Party Governance, Audit Management, and Business Resiliency. The connections between the different applications in the GRC products provide an integrative view of an enterprise and support its resources, processes and capabilities. Much of the information in a GRC system resides in connections between applications of the GRC platform. For example, a change in privacy regulations may lead to a change in assets management of an organization, which, in turn, may influence its vendors management program and other programs. Classic information retrieval techniques are not adequately equipped to take into account the connections between applications, and therefore fail to provide users with relevant and useful results.

FIG. 1 shows an information processing system 100 configured in accordance with an illustrative embodiment. The information processing system 100 comprises user devices 102-1, 102-2, . . . 102-M (collectively "user devices 102"). The user devices 102 communicate over a network 104 with a management and query processing platform 110.

The user devices 102 can comprise, for example, desktop, laptop or tablet computers, mobile telephones, or other types of processing devices capable of communicating with the management and query processing platform 110 over the network 104. The variable M and other similar index variables herein such as K and L are assumed to be arbitrary positive integers greater than or equal to two.

The term "client" or "user" herein is intended to be broadly construed so as to encompass numerous arrangements of human, hardware, software or firmware entities, as well as combinations of such entities. Records management and query processing services may be provided for users utilizing one or more machine learning models, although it is to be appreciated that other types of infrastructure arrangements could be used. At least a portion of the available services and functionalities provided by the management and query processing platform 110 in some embodiments may be provided under Function-as-a-Service ("FaaS") and/or Platform-as-a-Service ("PaaS") models, including cloud-based FaaS and PaaS environments.

The management and query processing platform 110 in the present embodiment is assumed to be accessible to the user devices 102 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The management and query processing platform 110, on behalf of respective infrastructure tenants each corresponding to one or more users associated with respective ones of the user devices 102, implements a records management engine 140 to rank and prioritize different records within a GRC platform according to their importance and impact on enterprise business. The management and query processing platform 110 further implements a user interface engine 120 and a query processing engine 130 to allow users of a GRC platform (e.g., GRC administrators, enterprise personnel) to effectively find, review and update the records that are most relevant to their purposes. According to an embodiment, the infrastructure tenants are cloud infrastructure tenants.

Due to the nature of enterprise processes and risk, fields in electronic documents under a GRC platform topic might be cross-referenced to other electronic documents pertaining to the same or different GRC platform topic. As used herein, cross references in a GRC system can represent different internal processes that are important to maintain the desired trajectory of an enterprise and enable an organization to reliably achieve objectives, address uncertainties and comply with requirements.

According to illustrative embodiments, the number of relationships that a document has with other important documents is indicative of the importance of that document to, for example, an enterprise or enterprise process associated with the GRC platform. For example, according to one or more embodiments, a document having fields which are cross referenced by many other documents determined to be important is deemed to be more important than a document with less relationships or no relationship to other important documents. Algorithms discussed herein accurately assess and determine the relative importance of the various documents in a GRC platform.

In order to provide effective and improved insights into the importance and impact of documents in a GRC platform, the management and query processing platform 110 leverages relationships between different electronic documents, such as, for example, cross referenced fields, to draw conclusions about the relative importance of each electronic document. As described further herein, the relative importance of a document, which is represented by a rank, may differ depending on topic. For example, a document may correspond to more than one topic, but have different levels of importance or relevance for each of those topics. The management and query processing platform 110 allows users to effectively find and review the documents that are most relevant to their needs. One or more embodiments provide improvements and modifications conventional search engine algorithms to address particular issues with respect to dynamic collections of documents in GRC platforms. Conventional techniques for document retrieval in GRC platforms rely on ineffective keyword searches, which lack prioritization of results and can be overly time consuming by requiring a user to review numerous different and non-relevant records before finding relevant documents.

The management and query processing platform 110 in some embodiments may be implemented as part of a cloud infrastructure in the form of a cloud-based system such as an AWS system. Other examples of cloud-based systems that can be used to provide at least portions of the management and query processing platform 110 and possibly other portions of system 100 include GCE, and Microsoft Azure®.

The management and query processing platform 110 in the embodiment of FIG. 1 illustratively comprises a user interface engine 120, a query processing engine 130 and a records management engine 140. The records management engine 140 includes a document classifier 141, an indexer 142, a relationship definer 143, a ranking component 144 and one or more databases 145.

In one or more illustrative embodiments, the database includes electronic content of a GRC system, including, for example, electronic documents having unique IDs for each field and document. The electronic documents may correspond to, for example, controls that enterprises have in place in order to meet requirements set forth by various laws and regulations. Enterprise personnel may need to regularly review the current controls, editing them and add new controls, so that the enterprises can ensure they are prepared to maintain compliance with changing and new laws and regulations. In addition to requirements and controls, the electronic documents may also correspond to, for example, procedures that should be in place across an enterprise. In a non-limiting example, such procedures can be used in response to a data breach under a Security Operations and Breach Management application of a GRC platform.

A document classifier 141 defines a plurality of fields in a plurality of electronic documents. An indexer 142 generates an inverted index of the electronic documents and their content. The database 145 includes the inverted index. The inverted index may be of text fields in the documents. Inverted indexes store mappings from content, such as words or numbers, to its locations in a database file, or in a document or a set of documents. For example, for each word, an inverted index may list the documents that include that word. Inverted indexes permit faster full text searches than with forward indexes.

The database 145 further includes relationships between the electronic documents of a GRC system. The relationships are defined by the relationship definer 143, and may be dynamically updated based on real-time changes to the documents. As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment of the invention is implemented, other appropriate timescales that provide at least contemporaneous performance and output can be achieved.

Figures 2A, 2B, 3:
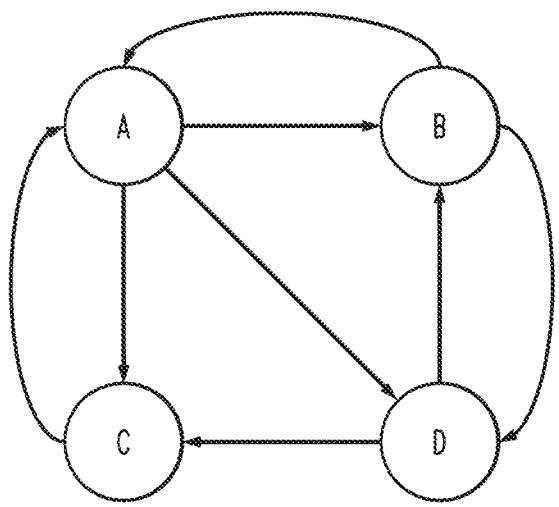
FIG. 2A is a diagram of relationships between documents in the management and query processing platform in an illustrative embodiment.
FIG. 2B is a matrix corresponding to the relationships between the documents in FIG. 2A in an illustrative embodiment.
FIG. 3 is a diagram illustrating a portion of a user interface for inputting a query in an illustrative embodiment.

Referring to FIG. 2A, which is a diagram 210 to illustrate relationships between documents in the management and query processing platform 110, nodes A, B, C and D are documents. A link between documents, as shown by an arrow, represents that a field in one document is cross referenced from another document. For example, arrows originating from node A extending to nodes B, C and D indicate that a field from document A is cross referenced in fields in documents B, C and D. The diagram 210 further illustrates links from node B to nodes A and D, a link from node C to node A, and links from node D to nodes B and C.

Referring to FIG. 2B, the relationship definer 143 defines a relationship matrix 220 where element $m_{i,j}$ is 1/k if document j has k outgoing links and one of them is to page i. Otherwise $m_{i,j}=0$. The columns in the relationship matrix 220 add up to one, and illustrate outgoing links from a particular node. For example, in accordance with the diagram in FIG. 2A, in the relationship matrix 220 in FIG. 2B, column A shows that node A has 3 outgoing links to nodes B, C and D, column B shows that node B has 2 outgoing links to nodes A and D, column C shows that node C has 1 outgoing link to node A, and column D shows that node D has two outgoing links to nodes B and C.

In order to extract the importance of a document in a GRC platform and compute respective document ranks, a ranking component 144 computes the principal eigenvector (V) in accordance with equation (1):

$$V=\lambda M^*V \quad (1)$$

M represents a stochastic relationship matrix (e.g., relationship matrix 220) where the columns sum to one, and $\lambda=1$. Starting with initial vector $V_0$ with element values of $$\frac{1}{n}$$

(n is number of documents), V is iteratively multiplied by M until there is little change in V (i.e., $V_{t+1} \approx V_t$). In a non-limiting illustrative example, ~50 iterations may be sufficient for convergence. As a further explanation of n, if there are 6 documents in the GRC system (n=6), the initial vector $V_0$ is (⅙, ⅙, ⅙, ⅙, ⅙, ⅙).

In addition, in an illustrative embodiment, when assessing the relative importance of documents across an entire enterprise, all self-references between documents (e.g., references between documents having the same purpose) are omitted. Self-references are references between documents that belong to the same application. For example, a document that contains a questionnaire under a Third Party Risk Assessment application of a GRC platform may be cross referenced to 3 documents that contain only one field each with the answer "Yes," "No," and "NA" under the same application. In this case, these self-references are omitted. Although an application name might be also a topic, documents having the same topic do not necessarily belong to the same application.

Figure 6:
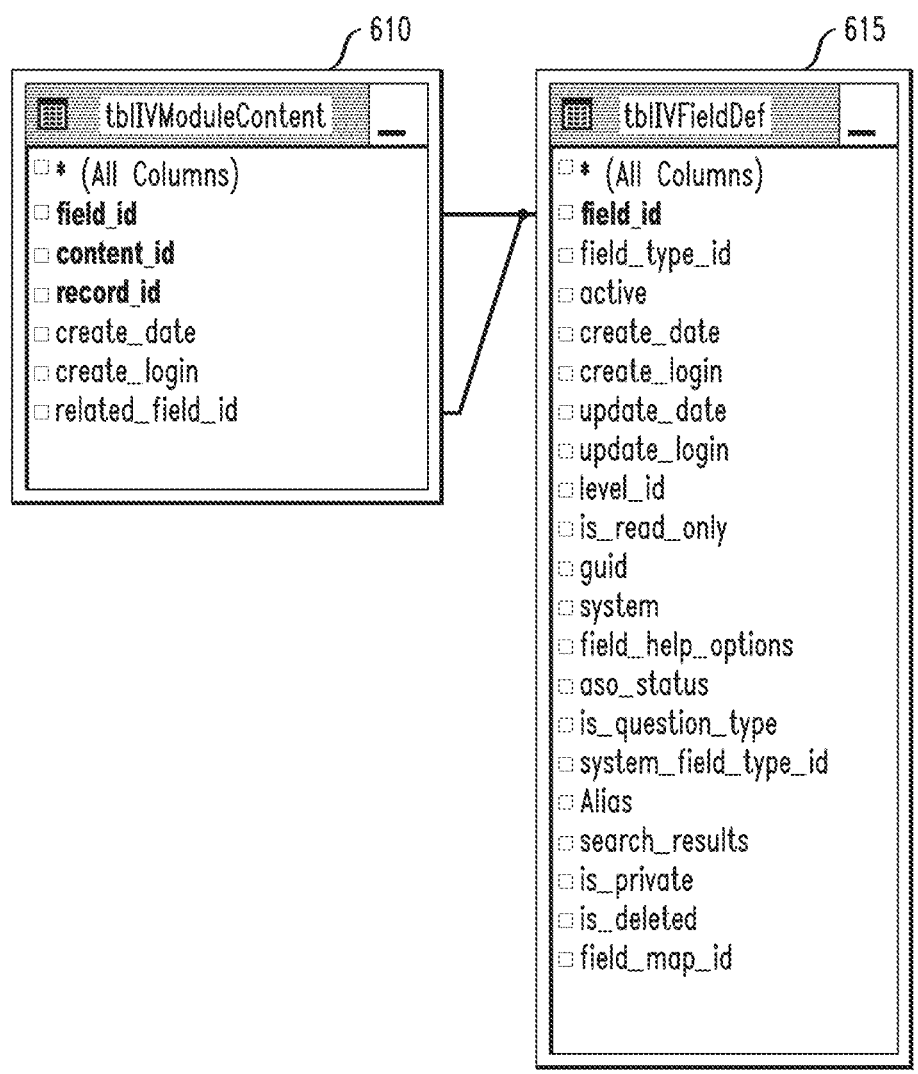
FIG. 6 shows example SQL tables used in connection with SQL code for retrieving data from a GRC platform database in an illustrative embodiment.

FIG. 5 shows example SQL code 500 for retrieving data from a platform database (e.g., database 145), and FIG. 6 shows example SQL tables 610 and 615 used in connection with the SQL code 500. The SQL code 500 is for retrieving document relationship data while removing self-references. For example, "tb_IIVModuleContent" corresponds to the storage of relationship data between documents, and "tblIV-FieldDef" corresponds to the storage of field information. "level_id" refers to a document type definition identifier which may be included, for example, in an application of a GRC platform. In order to remove self-referencing documents, the relationship definer 143 determines whether level ids are equal, and removes those documents where the level ids are equal to each other. The SQL code 500 is an example of any database query that filters out GRC documents that belong to the same application according to an indicator.

In one or more embodiments, the ranking component 144 modifies vectors derived from a relationship matrix to reduce or minimize the importance of or omit documents that have one or more fields related to other documents but no field that is cross referenced by another document, and to reduce or minimize the importance of or omit a group of documents that have relationships between each other, but none of the fields of the documents in the group is cross referenced outside of the group.

For example, the modification includes adjusting the power iterations algorithm of equation (1) in accordance with equation (2) to introduce a bias factor β:

$$V'=\beta MV+(1-\beta)e/n \quad (2)$$

In an illustrative embodiment, β=0.85, M is the relationship matrix, and the term (1−β)e/n is a vector with a similar size to that of V, with element values of $$\frac{(1-0.85)}{\text{number of documents in } GRC \text{ platform}}.$$

Such a modification significantly reduces the effect of the problematic documents or groups of documents. Rankings computed in accordance with equations (1) and (2) may be referred to as global rankings herein. In equation (2), e represents a vector with all values equal to 1, for example, (1, 1, 1, 1, 1, 1, 1).

Searching for documents in a GRC platform might be in the context of a specific topic. In this case, in one or more illustrative embodiments, the ranking component 144 is configured to bias the importance or rank of a document within the context of one or more topics. The topics may be specified in a query and ranking of query results can be based on the specified topic. For example, in addition to global rankings, the database 145 may include a plurality of topic-sensitive rankings of documents corresponding to respective topics, where documents may be ranked differently depending on the topic and the relevance of the documents to the topics.

In order to account for a topic, one or more embodiments modify equation (2) in accordance with equation (3) to take into account a number of documents pertaining to a topic:

$$V'=\beta MV+(1-\beta)e_s/|S| \qquad (3)$$

$|S|$ refers to the number of documents that correspond to a topic and $(1-\beta)e_s/|S|$ is a vector with a size V and value of $(1-\beta)/|S|$ in each place that represents a document that belongs to the topic and 0 otherwise. For example, $(1-\beta)e_s/|S|$ is a vector with the size of the number of documents in a system. Each place in this vector represents a specific document. If a document belongs to a topic, the corresponding value in this vector will be $(1-\beta)/|S|$. If the document does not belong to a topic, the corresponding value will be 0. For example, assuming there are 6 documents in the system, and the first two documents belong to a specified topic and the remaining documents do not belong to the specified topic, the vector will be: (½, ½, 0, 0, 0, 0).

While document ranking continues to be based on relationships, such a modification provides more weight to documents belonging to a particular a topic than those not belonging to the topic during the iteration process to compute ranks.

The user interface engine 120 includes a query builder 121 and a communication module 122. The communication module 122 includes appropriate interfaces, for example, application programming interfaces (APIs) for transmitting and receiving data to and from user devices 102 or other connected devices over the network 104. In accordance with one or more embodiments, the communication module 122 receives queries from one or more user devices 102 for documents in a GRC platform (e.g., documents in database 145). Query results output from the query processing engine 130 as described in more detail herein, are transmitted to the user devices 102 via the communication module 122.

A query builder 121 builds a query based on user input and sends the query to the query processing engine 130. FIG. 3 is a diagram illustrating a portion of a user interface 310 for inputting a query. In the interface 310, a user is directed to enter natural language keywords into box 312 corresponding to the documents being sought. As noted in blocks 316 and 318, a user can further specify one or more topic terms and one or more free text terms in the query so that documents corresponding to the noted topic terms and/or documents having the free text terms can be ranked higher. The query can be sent by actuating (e.g., clicking on a mouse, pressing on a touchscreen, etc.) a search button 314. In an illustrative embodiment, a topic may be extracted implicitly, for example, using the name of a GRC application from which the query is initialized, based on a query history of a particular user and/or using a classification algorithm that takes textual content of a document as an input and outputs labels that are most relevant to the textual content as topics.

The query processing engine 130 includes a document retriever 131, a features analyzer 132, a scoring and ranking component 133 and a feedback and training component 134. According to one or more embodiments, the document retriever 131 uses an inverted index of text fields in the documents to retrieve a list of candidate documents responsive to the query. As previously indicated, the inverted index is generated by the indexer 142.

Each candidate document includes at least one of the text terms that are in the query. If there is a topic that is part of the query, the relevant topic-sensitive document rankings pertaining to the specified topic is selected. The topic-sensitive document rankings can be stored in the database 145 and are generated from the relationship matrix using the topic-sensitive modifications as discussed hereinabove.

In one or more illustrative embodiments, in processing queries from one or more users, the features analyzer 132 identifies features in addition to the relationships described herein. The identified features are factored into computations to assign ranks to the various documents. The additional features that may be considered include, but are not necessarily limited to, the number of the free text terms from a query which are present in the text and title of a document, the number of topic terms from a query which are present in the text and title of a document, the number of cross references in a document, the number of fields in a document found to be related to fields in other documents, elapsed time from document creation, elapsed time since the document was modified, and/or elapsed time since the document was viewed.

The features analyzer 132 may also be configured: (i) to compute a similarity between a term frequency-inverse document frequency (TF-IDF) vector corresponding to one or more free text terms in a query and TF-IDF vectors corresponding to the one or more free text terms in a body and a title of respective ones of the candidate documents; and/or (ii) compute a similarity between a TF-IDF vector corresponding to one or more topic terms in a query and TF-IDF vectors corresponding to the one or more topic terms in a body and a title of respective ones of the candidate documents. The similarity can be, for example, cosine similarity, or be computed using another information retrieval algorithm such as, for example, Okapi BM25.

TF-IDF methodology creates a vector where each element in the vector represents a word and the TF-IDF value is calculated based on a corpus of existing documents. TF-IDF is utilized to identify and rank keywords or phrases based on a term's or phrase's frequent appearance in a particular portion of a document and lack of or infrequent appearance in the corpus. For example, TF-IDF refers to a numerical statistic reflecting the importance of a word to a document level with respect to a corpus. The TF-IDF value increases proportionally to the number of times a word appears in the document portion, but is also offset by the frequency of the word in the corpus, taking into account that some words are generally more common than others. It is to be understood that the embodiments are not limited to the use of TF-IDF, and there are alternative methodologies for text vectorization including, but not necessarily limited to, neural networks, auto-encoders, and/or word embedding. An auto encoder is a type of artificial neural network used for learning a representation for a set of data for dimensionality reduction. Word embedding uses language modeling and feature learning techniques in natural language processing (NLP) to map words or phrases to vectors of real numbers. In addition to the techniques described above, other machine learning models and components as described herein may also be used for text vectorization.

The features analyzer 132 may also retrieve and identify user centric features such as, for example, the last time a document was visited and/or modified by the specific user, the number of times a user visited a document, an enterprise unit to which a user belongs as recorded in a GRC system and/or previous queries made by a particular user.

The scoring and ranking component 133 computes a score for each retrieved document based on a determined relative importance of each document. In accordance with one or more embodiments, the scoring and ranking component 133 computes a unified score based on global and/or topic-sensitive rankings, and one or more of the additional features captured and analyzed by the features analyzer 132. According to illustrative embodiments, the unified score is generated using a predefined linear combination (i.e., $\Sigma_i w_i x_i$) of the features, which computes a sum of the scores calculated for global and topic-sensitive rankings, and each of the additional features. When computing the unified score, because some scores are determined to be more important than others, each score can be assigned a weight to obtain a weighted sum of the scores. For example, the global and/or topic-sensitive rankings may be given more weight than the additional features.

According to illustrative embodiments, the unified score can be generated using a machine learning model (e.g., linear regression, neural network, Support Vector Machine (SVM), Multilayer Perceptron (MLP), a deep learning model, decision trees and/or clustering) based on a training set collected by the feedback and training module 134. The training set includes, for example, user feedback about the ranking results. In one or more embodiments, the feedback and training module 134 periodically recalculates the global or topic-sensitive document ranks, and periodically retrains scoring models based on collected users' inputs regarding the ranking results. Query responses including the listing of candidate documents sorted according to the computed unified scores are transmitted to the user devices via the communication module 122 and the network(s) 104. According to one or more embodiments, indexing and global and/or topic-sensitive ranking calculations are periodically and dynamically calculated in order to achieve results which take into account various modifications to the electronic documents in a GRC platform over time.

One or more embodiments advantageously provide users with the ability to effectively search and retrieve documents that potentially have the most impact on their enterprise, so that the users may review, track and/or edit the documents as appropriate. Further, the techniques of the illustrative embodiments can be used to globally rank the different documents within a GRC platform or under specific topics in order to prioritize users' work and allow them to take action on the records having the most importance.

The user interface engine 120, query processing engine 130, records management engine 140 and other components of the management and query processing platform 110 comprise further hardware and software required for running the management and query processing platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

The databases or cloud environments discussed herein (e.g., database 145) may comprise a database service, such as, but not necessarily limited to GCE Cloud Storage, Microsoft Azure Blob (Binary Large Object) Storage, DynamoDB, MongoDB, Amazon Aurora and Oracle database.

The records management and query processing services performed by the management and query processing platform 110 can be performed based on real-time updates, modifications and/or additions to the electronic documents, so that the information processing system can react to events as they happen.

Although the user interface engine 120, query processing engine 130, records management engine 140 and other components of the management and query processing platform 110 in the present embodiment are shown as part of the management and query processing platform 110, at least a portion of the user interface engine 120, query processing engine 130, records management engine 140 and other components of the management and query processing platform 110 in other embodiments may be implemented on one or more other processing platforms that are accessible to the management and query processing platform 110 over one or more networks. Such components can each be implemented at least in part within another system element or at least in part utilizing one or more stand-alone components coupled to the network 104.

The databases described herein are assumed to comprise one or more storage systems configured to store information relating to processing performed, data used, and to other functionality of the management and query processing platform 110. Such storage systems can comprise any of a variety of different types of storage including network-attached storage (NAS), storage area networks (SANs), direct-attached storage (DAS) and distributed DAS, as well as combinations of these and other storage types, including software-defined storage.

Other particular types of storage products that can be used in implementing a given storage system of management and query processing platform 110 in an illustrative embodiment include VNX® and Symmetrix VMAX® storage arrays, flash hybrid storage products such as Unity™, software-defined storage products such as ScaleIO™ and ViPR®, cloud storage products such as Elastic Cloud Storage (ECS), object-based storage products such as Atmos®, scale-out all-flash storage arrays such as XtremIO®, and scale-out NAS clusters comprising Isilon® platform nodes and associated accelerators, all from Dell EMC. Combinations of multiple ones of these and other storage products can also be used in implementing a given storage system in an illustrative embodiment.

It is assumed that the management and query processing platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, user interface engine 120, query processing engine 130, records management engine 140 and other components of the management and query processing platform 110, and the elements thereof can each be implemented in the form of one or more LXCs running on one or more VMs. Other arrangements of one or more processing devices of a processing platform can be used to implement user interface engine 120, query processing engine 130 and records management engine 140, as well as other components of the management and query processing platform 110. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the management and query processing platform 110 to reside in different data centers. Numerous other distributed implementations of the management and query processing platform 110 are possible.

Accordingly, one or each of the user interface engine 120, query processing engine 130, records management engine 140 and other components of the management and query processing platform 110 can each be implemented in a distributed manner so as to comprise a plurality of distributed components implemented on respective ones of a plurality of compute nodes of the management and query processing platform 110.

It is to be appreciated that these and other features of illustrative embodiments are presented by way of example only, and should not be construed as limiting in any way.

Accordingly, different numbers, types and arrangements of system components such as the user interface engine 120, query processing engine 130, records management engine 140 and other components of the management and query processing platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the management and query processing platform can be offered to cloud infrastructure customers or other users as part of FaaS and/or PaaS offerings.

Figure 4:
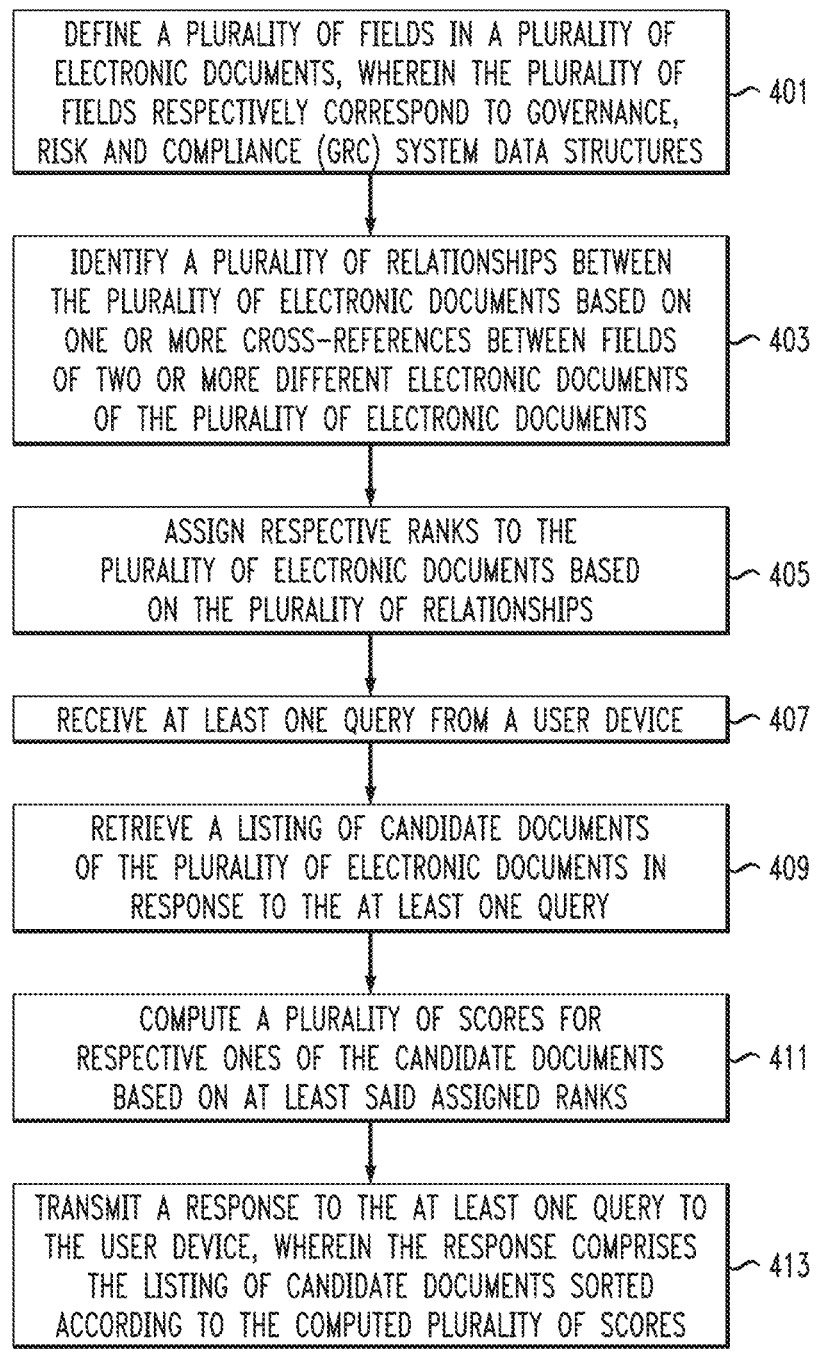
FIG. 4 is a flow diagram of a process for records management and query processing in an illustrative embodiment.

The operation of the information processing system 100 will now be described in further detail with reference to the flow diagram of FIG. 4. With reference to FIG. 4, a process 400 for records management and query processing as shown includes steps 401 through 413, and is suitable for use in the system 100 but is more generally applicable to other types of information processing systems comprising a management and query processing platform configured for use in searching and managing documents.

In step 401, a plurality of fields in a plurality of electronic documents are defined. In illustrative embodiments, the plurality of fields respectively correspond to GRC system data structures. The GRC system data structures may comprise data corresponding to one or more GRC functions for an enterprise and one or more correlations between the one or more GRC functions and one or more other GRC functions for the enterprise. In step 403, a plurality of relationships between the plurality of electronic documents are identified. The relationships are based on one or more cross-references between fields of two or more different electronic documents of the plurality of electronic documents. The two or more different electronic documents may be in different applications of the GRC system. The plurality of fields and plurality of electronic documents may correspond to respective unique identifiers. An inverted index may be generated for the plurality of electronic documents.

In steps 405 and 407, respective ranks to the plurality of electronic documents are assigned, and at least one query is received from a user device. The ranks are based on the plurality of relationships. The process can include generating a relationship matrix based on the plurality of relationships, and computing a vector based on the relationship matrix. The vector can be modified with a bias factor to compensate for documents that have one or more fields related to other documents but no field that is cross referenced by another document, and a group of documents that have relationships between each other, but none of the fields of the documents in the group is cross referenced outside of the group.

In assigning the respective ranks to the plurality of electronic documents, the vector is computed based on a number of the plurality of documents belonging to a topic. The topic may be specified in the at least one query. The query includes one or more free text terms and/or one or more topic terms.

In step 409, a listing of candidate documents of the plurality of electronic documents is retrieved in response to the at least one query. Steps 411 and 413 include computing a plurality of scores for respective ones of the candidate documents based on at least said assigned ranks, and transmitting a response to the at least one query to the user device. The response comprises the listing of candidate documents sorted according to the computed plurality of scores.

In accordance with one or more illustrative embodiments, one or more features of the respective ones of the candidate documents are determined, wherein the computed plurality of scores are further based on the determined one or more features. In computing the plurality of scores, the assigned ranks may be weighted higher than the determined one or more features.

In connection with the determination of the one or more features, the process may include identifying a number of the one or more free text terms and/or a number of the one or more topic terms from a query in a body and a title of respective ones of the candidate documents. A similarity can be computed between (i) a TF-IDF vector corresponding to the one or more free text terms in the query and TF-IDF vectors corresponding to the one or more free text terms in a body and a title of respective ones of the candidate documents; and/or (ii) a TF-IDF vector corresponding to one or more topic terms in the query and TF-IDF vectors corresponding to the one or more topic terms in a body and a title of respective ones of the candidate documents.

It is to be appreciated that the FIG. 4 process and other features and functionality described above can be adapted for use with other types of information systems configured to execute records management and query processing services on a management and query processing platform or other type of processing platform.

The particular processing operations and other system functionality described in conjunction with the flow diagram of FIG. 4 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

FIG. 7 shows example pseudocode 700 for loading retrieved data into a dataframe, and FIG. 8 shows an example dataframe 800 in response to execution of the pseudocode 700. Referring back to FIG. 2A, where documents correspond to nodes, "content_id" and "record_id" in FIGS. 7 and 8 correspond to the document identifiers (e.g., unique IDs) for documents that are nodes. Each line 0, 1, 2, 3, 4 in the dataframe 800 represents an edge between nodes. For example, according to the first line 0, there is an edge from document 150855 to document 123097. "field_id" and "related_field_id" indicate the GRC applications to which these documents belong. Dataframes like dataframe 800 are inputs used in connection with the determination of topic sensitive rankings.

FIG. 9 shows example pseudocode 900 for retrieving content from respective documents, and FIG. 10 shows an example output 1000 in response to execution of the pseudocode 900. The output 1000 includes text (under "field_value") for each document identified by its content_id, and field_id designations indicate the GRC applications to which the documents belong. The data in outputs like output 1000 is used for indexing and for TF-IDF calculations.

Illustrative embodiments of systems with the management and query processing platform as disclosed herein can provide a number of significant advantages relative to conventional arrangements. For example, one or more embodiments are configured to address problems with current approaches for records retrieval in GRC platforms, which rely on ineffective keyword searches that may be available in different text editors, such as PDF readers and word and spreadsheet processors. Conventional methods require processes of drilling down and scrolling through hundreds of records with matching keywords in order to find the records of interest. Additionally, some conventional methods are limited to searching with free text terms, which retrieves all records with at least one of these terms, requiring a user to set several filters in order to limit the list of records to review.

These conventional approaches waste computational resources by retrieving numerous non-relevant documents. Furthermore, the conventional techniques do not provide any prioritization of the search results and require users to review many different and irrelevant documents before finding relevant documents. As can be understood, conventional approaches, to their detriment, rely heavily on the experience of the GRC platform users and their understanding and proficiency of regulations and controls in an enterprise. Using conventional methods, GRC platform users with less ability or limited experience to recall or understand existing GRC content in an enterprise will experience increased difficulty in finding relevant documents. Using current technology, the learning curve for new GRC platform users may be very long, and, therefore, extend the time for a new GRC platform users to be effective.

Currently, there are no techniques or solutions for records retrieval in GRC platforms which rely on the important information that can be derived from the relations and references that documents have with other documents. As an advantage, one or more embodiments enable the less experienced GRC platform user to find GRC records that potentially have the highest impact on their enterprise tasks by taking into account the effect of the documents on other related documents. Prioritization that takes into account the relationships between documents results in significantly more accurate and relevant ranking than prioritization based on text or rules only. The illustrative embodiments leverage information that exists in a GRC platform beyond merely textual content in order to provide better ranking given the context of the GRC platform. The embodiments take into account domain specific information, such as the relationship between documents, the ways users and enterprises utilize a GRC platform to manage risk.

In addition, unlike former approaches, the illustrative embodiments enable the search algorithm to be improved over time by periodically recalculating the global and/or topic sensitive document ranks, and periodically retraining the scoring model based on collected users' inputs. The embodiments are not necessarily limited to records searching and retrieval, and determination and analysis of the global and topic sensitive rank of each document in a GRC platform can be used to generate suggestions to users about which records to address first based on their impact and importance across an enterprise.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the management and query processing platform 110 or portions thereof are illustratively implemented for use by tenants of such a multi-tenant environment.

As mentioned previously, cloud infrastructure as disclosed herein can include cloud-based systems such as AWS, GCE and Microsoft Azure. Virtual machines provided in such systems can be used to implement at least portions of one or more of a computer system and a management and query processing platform in illustrative embodiments. These and other cloud-based systems in illustrative embodiments can include object stores such as AWS S3, GCE Cloud Storage, and Microsoft Azure Blob Storage.

Illustrative embodiments of processing platforms will now be described in greater detail with reference to FIGS. 11 and 12. Although described in the context of system 100, these platforms may also be used to implement at least portions of other information processing systems in other embodiments.

Figure 11:
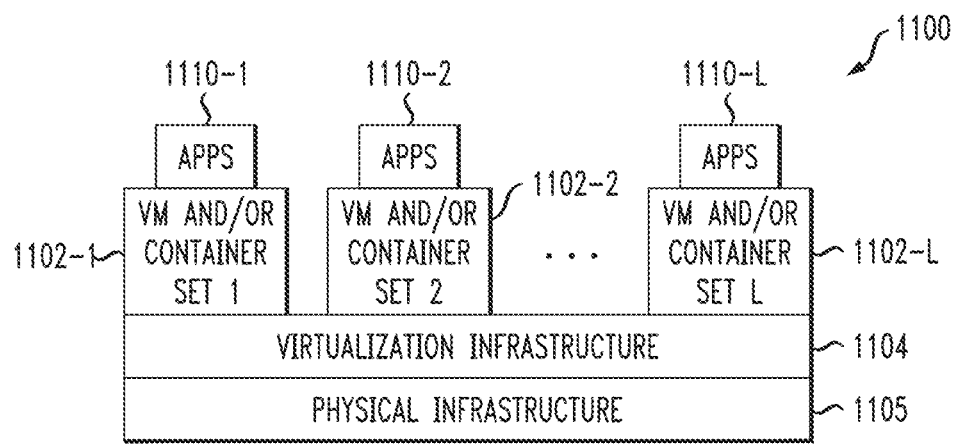
FIGS. 11 and 12 show examples of processing platforms that may be utilized to implement at least a portion of an information processing system in illustrative embodiments.
Figure 12:
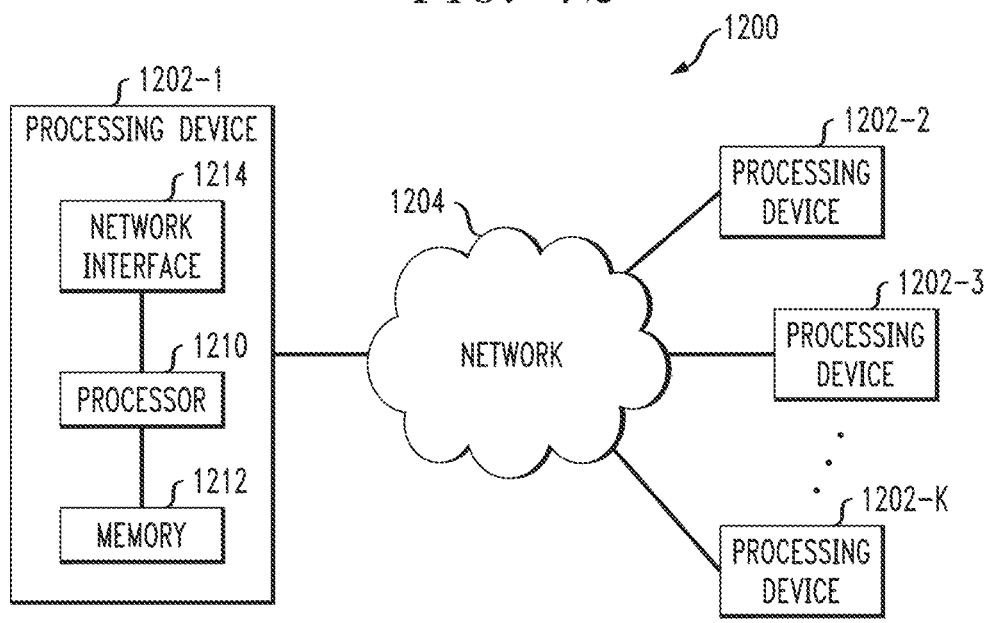

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. Such implementations can provide records management and query processing functionality of the type described above for one or more processes running on a given one of the VMs. For example, each of the VMs can implement records management and query processing for one or more processes running on that particular VM.

An example of a hypervisor platform that may be used to implement a hypervisor within the virtualization infrastructure 1104 is the VMware® vSphere® which may have an associated virtual infrastructure management system such as the VMware® vCenter™. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system. Such implementations can provide records management and query processing functionality of the type described above for one or more processes running on different ones of the containers. For example, a container host device supporting multiple containers of one or more container sets can implement one or more instances of records management and query processing.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212. The processor 1210 may comprise a microprocessor, a microcontroller, an application-specific integrated circuit (ASIC), a field-programmable gate array (FPGA) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the management and query processing platform 110 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and management and query processing platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising a plurality of processing devices;
   said at least one processing platform being configured:
   to define a plurality of fields in a plurality of electronic documents, wherein the plurality of fields respectively correspond to governance, risk and compliance (GRC) system data structures;
   to identify a plurality of relationships between the plurality of electronic documents based on one or more cross-references between fields of two or more different electronic documents of the plurality of electronic documents;
   to assign respective ranks to the plurality of electronic documents based on the plurality of relationships;
   to receive at least one query from a user device;
   to retrieve a listing of candidate documents of the plurality of electronic documents in response to the at least one query;
   to compute a plurality of scores for respective ones of the candidate documents based on at least said assigned ranks; and
   to transmit a response to the at least one query to the user device, wherein the response comprises the listing of the candidate documents sorted according to the computed plurality of scores;
   wherein in defining the plurality of fields, said at least one processing platform is configured:
   to define a field of a first one of the two or more different electronic documents comprising a first data element corresponding to a first GRC function; and
   to define a field of a second one of the two or more different electronic documents comprising a second data element corresponding to a second GRC function;
   wherein the one or more cross-references comprise a reference from the first data element to the second data element; and
   wherein, in assigning the respective ranks, said at least one processing platform is configured to determine relative importance of respective ones of the plurality of electronic documents based at least in part on the plurality of relationships, wherein the determination comprises:
   comparing document type identifiers of the respective ones of the plurality of electronic documents; and
   omitting relationships between two or more electronic documents of the plurality of electronic documents having the same document type identifiers.

2. The apparatus of claim 1 wherein the GRC system data structures comprise data corresponding to one or more GRC functions for an enterprise and one or more correlations between the one or more GRC functions and one or more other GRC functions for the enterprise.

3. The apparatus of claim 2 wherein the two or more different electronic documents are in different applications of the GRC system.

4. The apparatus of claim 1 wherein at least one of the plurality of fields and the plurality of electronic documents correspond to respective unique identifiers.

5. The apparatus of claim 1 wherein said at least one processing platform is further configured to generate an inverted index for the plurality of electronic documents.

6. The apparatus of claim 1 wherein said at least one processing platform is further configured:
   to generate a relationship matrix based on the plurality of relationships; and
   to compute a vector based on the relationship matrix.

7. The apparatus of claim 6 wherein said at least one processing platform is further configured to modify the vector with a bias factor.

8. The apparatus of claim 1 wherein in assigning the respective ranks to the plurality of electronic documents said at least one processing platform is further configured to compute a vector based on a number of the plurality of documents belonging to a topic.

9. The apparatus of claim 8 wherein the topic is specified in the at least one query.

10. The apparatus of claim 1 wherein the at least one query includes at least one of one or more free text terms and one or more topic terms.

11. The apparatus of claim 10 wherein said at least one processing platform is further configured to identify at least one of a number of the one or more free text terms and a number of the one or more topic terms in a body and a title of respective ones of the candidate documents.

12. The apparatus of claim 10 wherein said at least one processing platform is further configured to compute a similarity between a term frequency-inverse document frequency (TF-IDF) vector corresponding to the one or more free text terms in the at least one query and TF-IDF vectors corresponding to the one or more free text terms in a body and a title of respective ones of the candidate documents.

13. The apparatus of claim 10 wherein said at least one processing platform is further configured to compute a similarity between a term frequency-inverse document frequency (TF-IDF) vector corresponding to one or more topic terms in the at least one query and TF-IDF vectors corresponding to the one or more topic terms in a body and a title of respective ones of the candidate documents.

14. The apparatus of claim 1 wherein said at least one processing platform is further configured to determine one or more features of the respective ones of the candidate documents, wherein the computed plurality of scores are further based on the determined one or more features.

15. The apparatus of claim 14 wherein, in computing the plurality of scores, said at least one processing platform is further configured to weight said assigned ranks higher than the determined one or more features.

16. A method comprising:
defining a plurality of fields in a plurality of electronic documents, wherein the plurality of fields respectively correspond to governance, risk and compliance (GRC) system data structures;
identifying a plurality of relationships between the plurality of electronic documents based on one or more cross-references between fields of two or more different electronic documents of the plurality of electronic documents;
assigning respective ranks to the plurality of electronic documents based on the plurality of relationships;
receiving at least one query from a user device;
retrieving a listing of candidate documents of the plurality of electronic documents in response to the at least one query;
computing a plurality of scores for respective ones of the candidate documents based on at least said assigned ranks; and
transmitting a response to the at least one query to the user device, wherein the response comprises the listing of the candidate documents sorted according to the computed plurality of scores;
wherein defining the plurality of fields comprises:
defining a field of a first one of the two or more different electronic documents comprising a first data element corresponding to a first GRC function; and
defining a field of a second one of the two or more different electronic documents comprising a second data element corresponding to a second GRC function;
wherein the one or more cross-references comprise a reference from the first data element to the second data element;
wherein assigning the respective ranks comprises determining relative importance of respective ones of the plurality of electronic documents based at least in part on the plurality of relationships, wherein the determination comprises:
comparing document type identifiers of the respective ones of the plurality of electronic documents; and
omitting relationships between two or more electronic documents of the plurality of electronic documents having the same document type identifiers; and wherein the method is performed by at least one processing platform comprising at least one processing device comprising a processor coupled to a memory.

17. The method of claim 16 further comprising:
generating a relationship matrix based on the plurality of relationships; and
computing a vector based on the relationship matrix.

18. The method of claim 16 wherein assigning the respective ranks to the plurality of electronic documents further comprises computing a vector based on a number of the plurality of documents belonging to a topic.

19. A computer program product comprising a non-transitory processor-readable storage medium having stored therein program code of one or more software programs, wherein the program code when executed by at least one processing platform causes said at least one processing platform:
to define a plurality of fields in a plurality of electronic documents, wherein the plurality of fields respectively correspond to governance, risk and compliance (GRC) system data structures;
to identify a plurality of relationships between the plurality of electronic documents based on one or more cross-references between fields of two or more different electronic documents of the plurality of electronic documents;
to assign respective ranks to the plurality of electronic documents based on the plurality of relationships;
to receive at least one query from a user device;
to retrieve a listing of candidate documents of the plurality of electronic documents in response to the at least one query;
to compute a plurality of scores for respective ones of the candidate documents based on at least said assigned ranks; and
to transmit a response to the at least one query to the user device, wherein the response comprises the listing of the candidate documents sorted according to the computed plurality of scores;
wherein in defining the plurality of fields, the program code further causes said at least one processing platform:
to define a field of a first one of the two or more different electronic documents comprising a first data element corresponding to a first GRC function; and
to define a field of a second one of the two or more different electronic documents comprising a second data element corresponding to a second GRC function;
wherein the one or more cross-references comprise a reference from the first data element to the second data element; and
wherein, in assigning the respective ranks, the program code further causes said at least one processing platform to determine relative importance of respective ones of the plurality of electronic documents based at least in part on the plurality of relationships, wherein the determination comprises:
comparing document type identifiers of the respective ones of the plurality of electronic documents; and
omitting relationships between two or more electronic documents of the plurality of electronic documents having the same document type identifiers.

20. The computer program product according to claim 19 wherein, in assigning the respective ranks to the plurality of electronic documents the program code further causes said at least one processing platform to compute a vector based on a number of the plurality of documents belonging to a topic.

21. The computer program product according to claim 19 wherein the program code further causes said at least one processing platform:
- to generate a relationship matrix based on the plurality of relationships; and
- to compute a vector based on the relationship matrix.

* * * * *